United States Patent [19]

Pauza et al.

[11] Patent Number: 5,569,047
[45] Date of Patent: Oct. 29, 1996

[54] LATCHING SYSTEM FOR INTERMATABLE TRANSMISSION CONNECTORS

[75] Inventors: William V. Pauza, Palmyra; Harold W. Kerlin, Port Royal, both of Pa.

[73] Assignee: The Whitaker Corporation, Wilmington, Del.

[21] Appl. No.: 521,718

[22] Filed: Aug. 31, 1995

[51] Int. Cl.⁶ .................................................. H01R 13/627
[52] U.S. Cl. ............................................ 439/353; 439/358
[58] Field of Search ................................. 439/345, 350, 439/352, 353, 354, 357, 358

[56] References Cited

U.S. PATENT DOCUMENTS

| | | | |
|---|---|---|---|
| 4,726,783 | 2/1988 | Nakazawa et al. | 439/350 |
| 4,762,505 | 8/1988 | Asick et al. | 439/347 |
| 5,124,506 | 6/1992 | Briggs et al. | 174/67 |
| 5,158,473 | 10/1992 | Takahashi et al. | 439/353 |
| 5,213,533 | 5/1993 | Walden | 439/372 |
| 5,277,627 | 1/1994 | Matsuzaki | 439/677 |
| 5,314,347 | 5/1994 | Colleran et al. | 439/350 |

*Primary Examiner*—Khiem Nguyen

[57] ABSTRACT

Invention is directed to an improved, squeeze-to-release latching mechanism for a pair of intermatable transmission connectors, such as electrical or fiber optic connector assemblies, where access to the sides of the connectors may be limited, thereby preventing a traditional manual unmating thereof. The connectors typically comprises a plug consisting of a housing having top and bottom surfaces, where such housing supports a first transmission component, and a receptacle supporting a second transmission component, where the plug includes a pair of cantilevered flexible arms engagable with complementary latching projections on the receptacle. The arms have exposed intermediate portions manually movable toward one another, such as by squeezing, to disengage the latching projections from the flexible arms. The improved feature hereof is the provision of each intermediate portion having a pair of wing extensions directed toward the top and bottom surfaces of the plug housing, where the ends of the extensions are laterally turned to lie essentially parallel with a respective top or bottom surface. By the construction of this U-configured intermediate portion, the flexible arms may be grasped diagonally and moved toward another to effect an unmating of the plug from the receptacle.

10 Claims, 5 Drawing Sheets

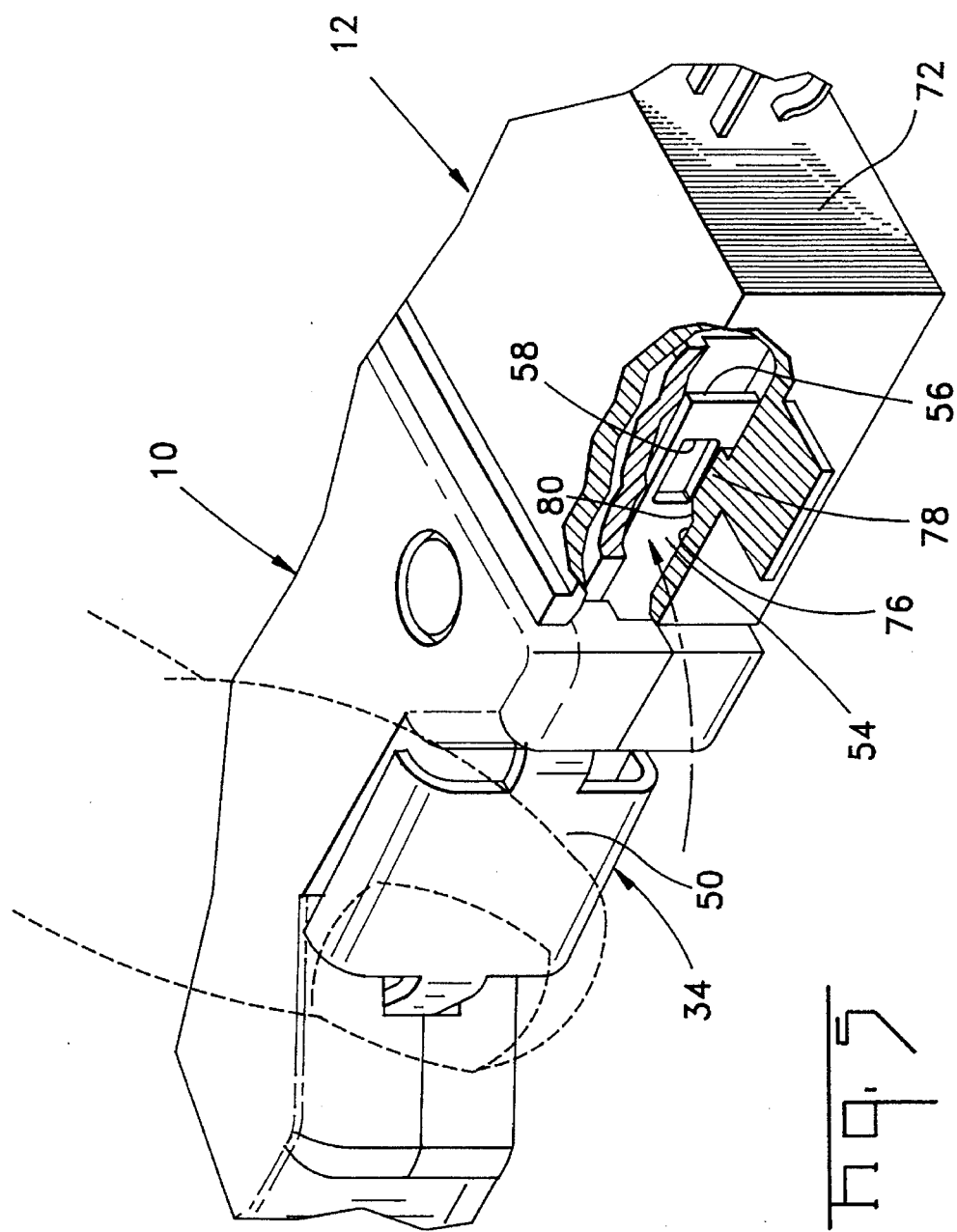

LATCHING SYSTEM FOR INTERMATABLE TRANSMISSION CONNECTORS

BACKGROUND OF THE INVENTION

This invention is directed to a squeeze-to-release type intermatable transmission connector, such as electrical or fiber optic connectors. While a preferred embodiment relates to incorporating the system hereof in a pair of intermatable electrical connectors, and the further description hereof will be so limited, no undue restrictions shall be read on this invention except as set forth in the appended claim. It will be understood, as clearly illustrated and described in the following specification, that the internally supported transmission components, i.e. electrical or fiber optic, are independent of the latching system. Accordingly, the discussion of the electrical transmission components is only for purposes of illustration and understanding.

Squeeze-to-release latching systems have been known for years as exemplified by the prior art in the area of intermatable connectors. U.S. Pat. No. 5,041,025, teaches, among other features, a latching mechanism which includes a pair of deflectable latches having latch ears which permit mechanical coupling of a plug connector in a receptacle connector. Unlatching, or decoupling, is accomplished by laterally squeezing the latches toward the plug connector body to free the latch ears and allow separation of the respective connectors.

U.S. Pat. No. 4,726,783 discloses a pivotal locking mechanism for a pair of intermatable connectors, where the mechanism includes a pair of locking members, each having an engaging portion, a pressing portion and a fulcrum therebetween. Laterally squeezing the pressing portions causes the members to pivot about the respective fulcrums to free the engaging portions.

U.S. Pat. No. 5,314,347 offers a different approach to unmating a pair of connectors. Briefly, such unmating relies upon a unidirectional pressing of a flexible, wraparound unlatching band that overrides the connector housing, which when depressed causes the band to bulge at the side latching locations and thereby free the respective connectors for unmating, note the sequence of FIGS. 3 and 4 of the patent.

None of these patents, however, address the issue of accessibility. In U.S. Pat. No. 4,762,505, note particularly FIG. 7 thereof, where the problem of lateral or side accessibility is demonstrated. When plural plug assemblies are disposed in side-by-side fashion, there is difficulty in accessing the sides of the respective plug assemblies to effect unmating by traditional squeeze-to-release systems. The patentees of '505 avoid such difficulty by providing for a latching/delatching system that frees the mated connectors upon the application of a predetermined axial or separating force, i.e. pulling the cable which is terminated to one of the connectors.

The present invention, by incorporating a unique latch construction feature, employs the traditional squeeze-to-release type latching mechanism, but which can be operated by a diagonal pinching action. By this arrangement, side or lateral accessibility is no longer a concern. This and other features of the invention will become apparent from the specification which follows, particularly when read in conjunction with the accompanying drawings.

SUMMARY OF THE INVENTION

This invention relates to an improved latching mechanism for a pair of intermatable transmission connectors, such as electrical or fiber optic connector assemblies, where access to the sides of the connectors may be limited, thereby preventing a manual unmating thereof. The connectors typically comprise a plug having top and bottom surfaces, and a receptacle, where the plug includes a pair of cantilevered flexible arms engagable with complementary latching projections on the receptacle. The arms have exposed intermediate portions manually movable toward one another, such as by squeezing, to disengage the latching projections from the flexible arms. The improved feature hereof is the provision of each intermediate portion having a pair of wing extensions directed toward the top and bottom surfaces of the plug, where the ends of the extensions are laterally turned to lie essentially parallel with a respective top or bottom surface. By this arrangement, the flexible arms may be grasped diagonally and moved toward one another to effect an unmating of the plug from the receptacle.

BRIEF DESCRIPTION OF DRAWINGS

FIGS. 4 and 5 are enlarged, partial perspective views of the mated plug assembly and receptacle connector of FIG. 1, with wall portions removed to reveal a mating condition and an unmating condition, respectively.

DETAILED DESCRIPTION OF PREFERRED EMBODIMENT

Figure 1:
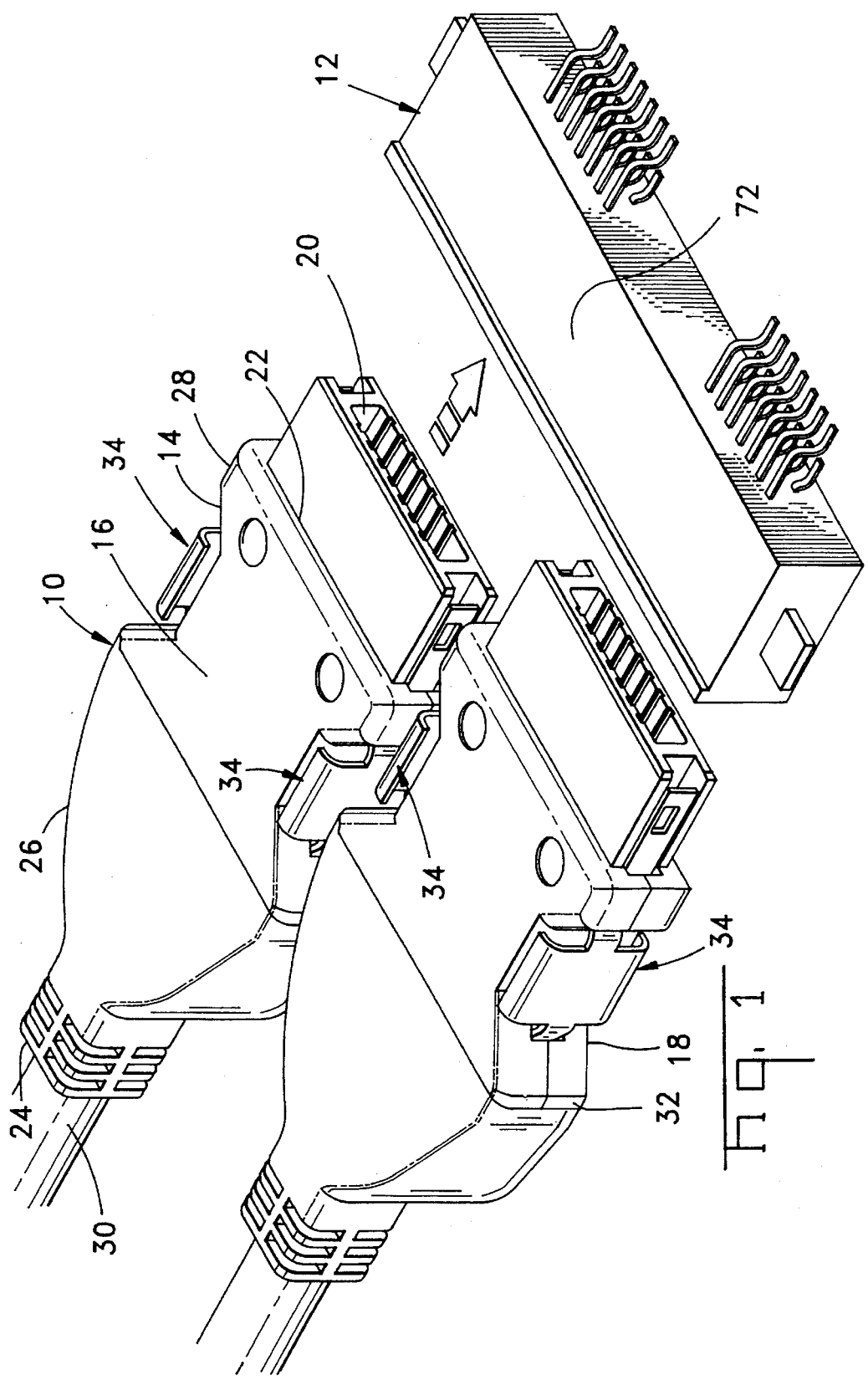
FIG. 1 is a perspective view of a pair of transmission connectors, in the preferred form of electrical plug assemblies, poised for mating with a single complementary receptacle connector, illustrating the kind of application to which this invention is best suited.
Figure 2:
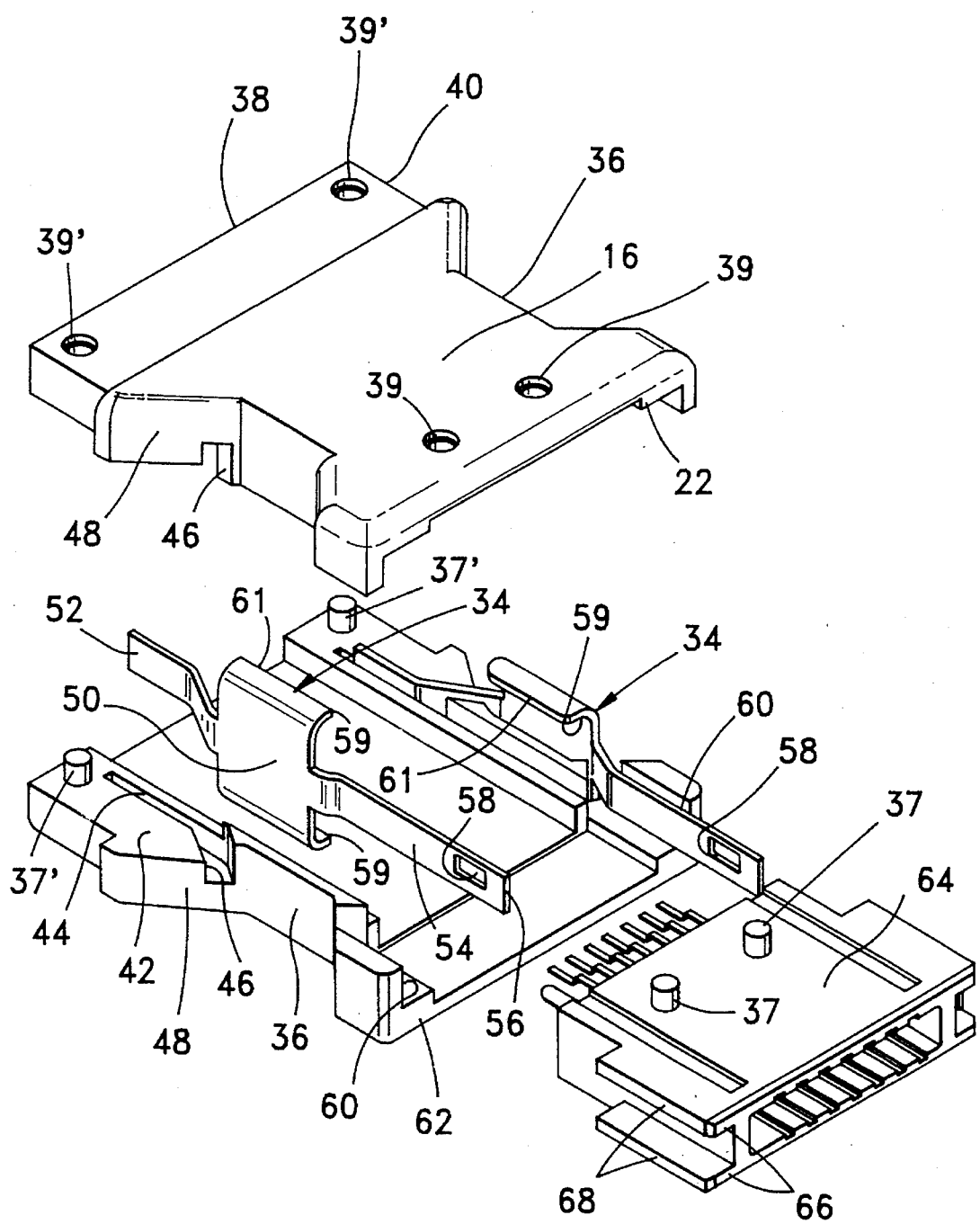
FIG. 2 is a partial, exploded perspective view illustrating a pair of hermaphroditic, connector housing sections, a mounted and a free cantilevered latching arm, and a transmission component housing poised for entry into the mated housing sections, where such members form a plug assembly according to this invention.

This invention is directed to an improved latching mechanism for a pair of intermatable transmission connectors. In a preferred embodiment, as best illustrated in FIGS. 1 and 2, the intermatable connectors may comprises an electrical plug assembly 10 and a complementary electrical receptacle 12. Since a critical feature of the latching mechanism of this invention is its unique construction to allow unmating or decoupling of the connectors diagonally of the plug assembly body, a pair of closely spaced plug assemblies have been illustrated, as this represents the type of environment or application which best demonstrates the contributions of this invention. Since the respective plug assemblies 10 are essentially identical in construction and function, except perhaps for differences in the internal transmission components, only a single plug assembly 10 will be described in the further description hereafter.

A plug assembly 10, as seen in FIGS. 1 and 2, may be comprised of a dielectric housing 14 having top and bottom surfaces 16, 18 respectively, a central through cavity 20 for receiving and supporting transmission components, a mating face 22 and a cable receiving end 24. The housing 14, as illustrated, includes a broader rear boot portion 26 and a narrower forward portion 28. In the case of an electrical connector, the cable 30 is typically plural conductors within a sheath of an insulating layer, such as plastic. Within the housing 14, the conductors are separated and planarly arranged within rear boot portion 26 for termination to corresponding contacts of the transmission components supported in the forward portion 28. Along each side 32, preferably at the narrower forward portion 28, is a cantilevered latching mechanism 34, the operation of which will be described in more detail hereafter.

For convenience in molding and manufacturing, the housing 14, as best seen in FIG. 2, may comprise a pair of hermaphroditic housing sections 36, where in the assembled condition to form a unitary housing such sections may be ultrasonically welded about their facing peripheries, or heat staked, by techniques known in the art, to form the unitary structure. In the preferred embodiment of FIGS. 1 and 2, heat staking posts 37 37' are illustrated at the rear of mating face 42, and housing 64, as hereinafter described, where such posts are aligned with corresponding holes 39,39' in the housing sections 36 for heat staking to effect an integral structure. The rear 38, or end remote from the mating face 22, is characterized by a reduced or stepped portion 40. The mated reduced portions 40 are sized to receive in sliding engagement the rear boot portion 26.

Along the respective mating faces 42, toward the rear 38, a pair of elongated slots 44 are provided. The slots 44 open 46 into the sides 48 at an angle, where the opening is broad to allow flexing movement of the latching mechanism 34, as hereinafter explained. The latching mechanism 34, as seen isolated in FIG. 2, comprises a metal member stamped and formed from a sheet metal blank, such as stainless steel. The latching mechanism includes a central portion 50, and first and second arms 52,54 extending therefrom. The first arm 52 is sized and formed to be press-fit into a corresponding slot 44 such that the central portion 50 is spaced from the side wall of the housing 14. By fixing the first arm 52, the latching mechanism is mounted in a cantilevered fashion with the second arm 54 free for limited movement. To effect latching of the second arm 54, the free or remote end 56 thereof is provided with an opening 58, the function of which will become apparent hereafter. Finally, as best seen in FIG. 2, the central portion 50 includes a pair of wing extensions 59 having the end portions 61 thereof bent inwardly and laterally in a manner essentially parallel to the respective top and bottom surfaces 16,18. A further feature of the housing sections 36 is the provision of recessed side walls 60 at the transmission component receiving end 62. In the secured position for the latching mechanism 34, see FIG. 2, the second arm 54 is spaced from its corresponding side wall 60 and is free to flex toward and away from said side wall.

Completing the plug assembly 10 are the transmission components, portions of which are shown in FIG. 2, supported by a dielectric housing 64. It should again be noted that the transmission components may be electrical or fiber optic, or a combination thereof. Accordingly, such illustrated components are solely presented for ease of understanding. In any event, the housing 64 is characterized by a pair of outwardly extending channels 66, the outermost edges 68 of which seat against a respective side wall 60. Thus, the channel and side wall define the limit or extent of the lateral movement of the second arm 54. To assemble the plug assembly, after termination of the wires or cables to an appropriate transmission component within the housing 64, such transmission component housing may be press-fit into the housing 14, and secured therein by techniques known in the art, followed by securing the rear boot portion 26 at the opposite end to the reduced portions 40. The plug assembly 10 is now ready for mating with a complementary receptacle connector.

Figure 4:
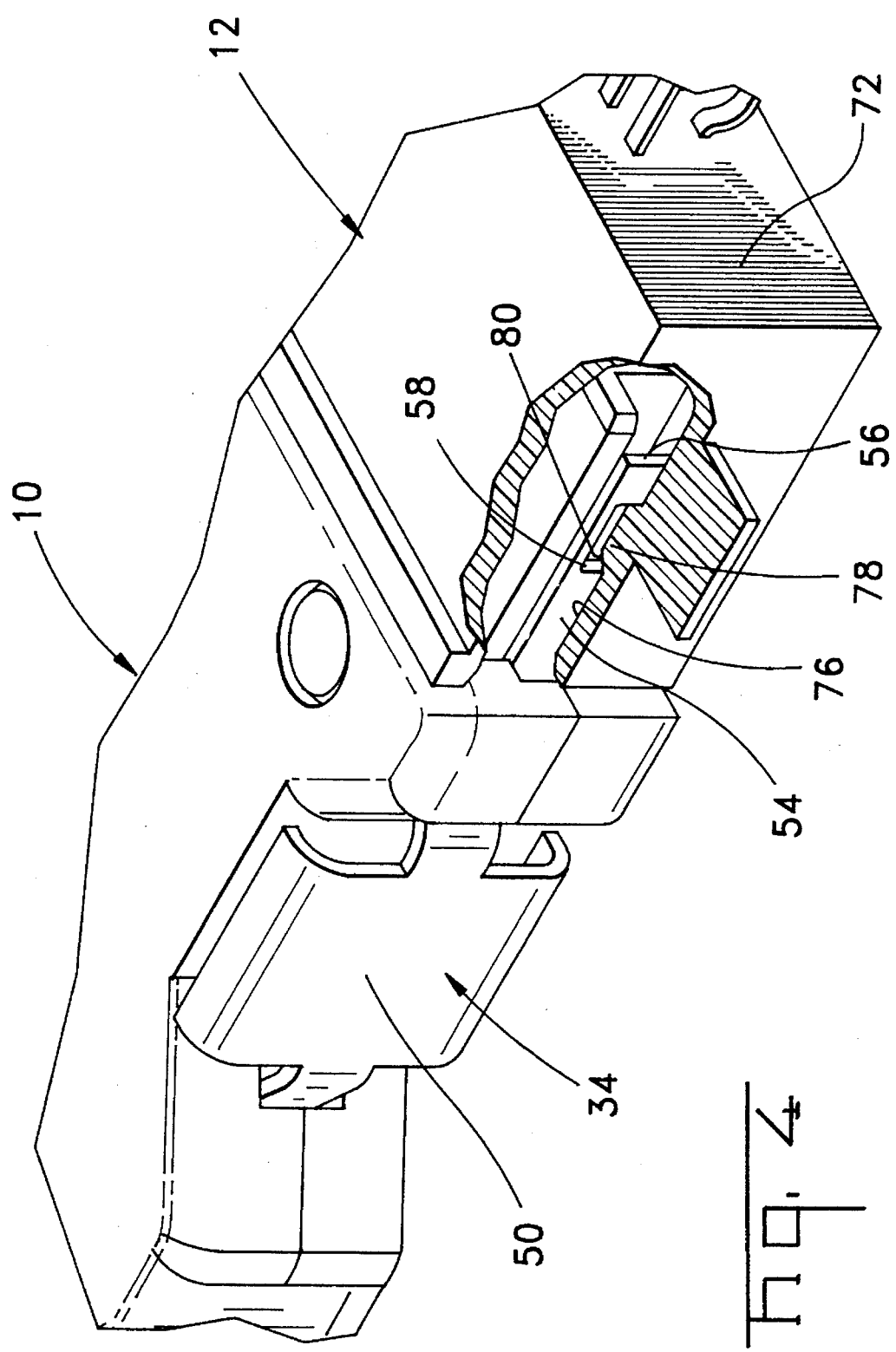

The receptacle connector 12, to which one or more plug assemblies 10 are mated, comprises a dielectric housing 72 having a complementary number of cavities into which the plug assemblies 10 are received, as known in the art. Mounted and supported within such cavities are transmission components for mating with the complementary transmission components in the one or more plug assemblies 10. An exemplary showing of this will be made in conjunction with the remaining Figures. As best seen in FIGS. 4 and 5, along the side walls 76 of the respective cavities is a pair of opposing ramped projections 78 which receive the opening 58 and cooperate with the latching mechanism 34 to effectively secure the plug assemblies 10 within the receptacle connector 12o Again, this will become more apparent in the description which follows.

Figure 3:
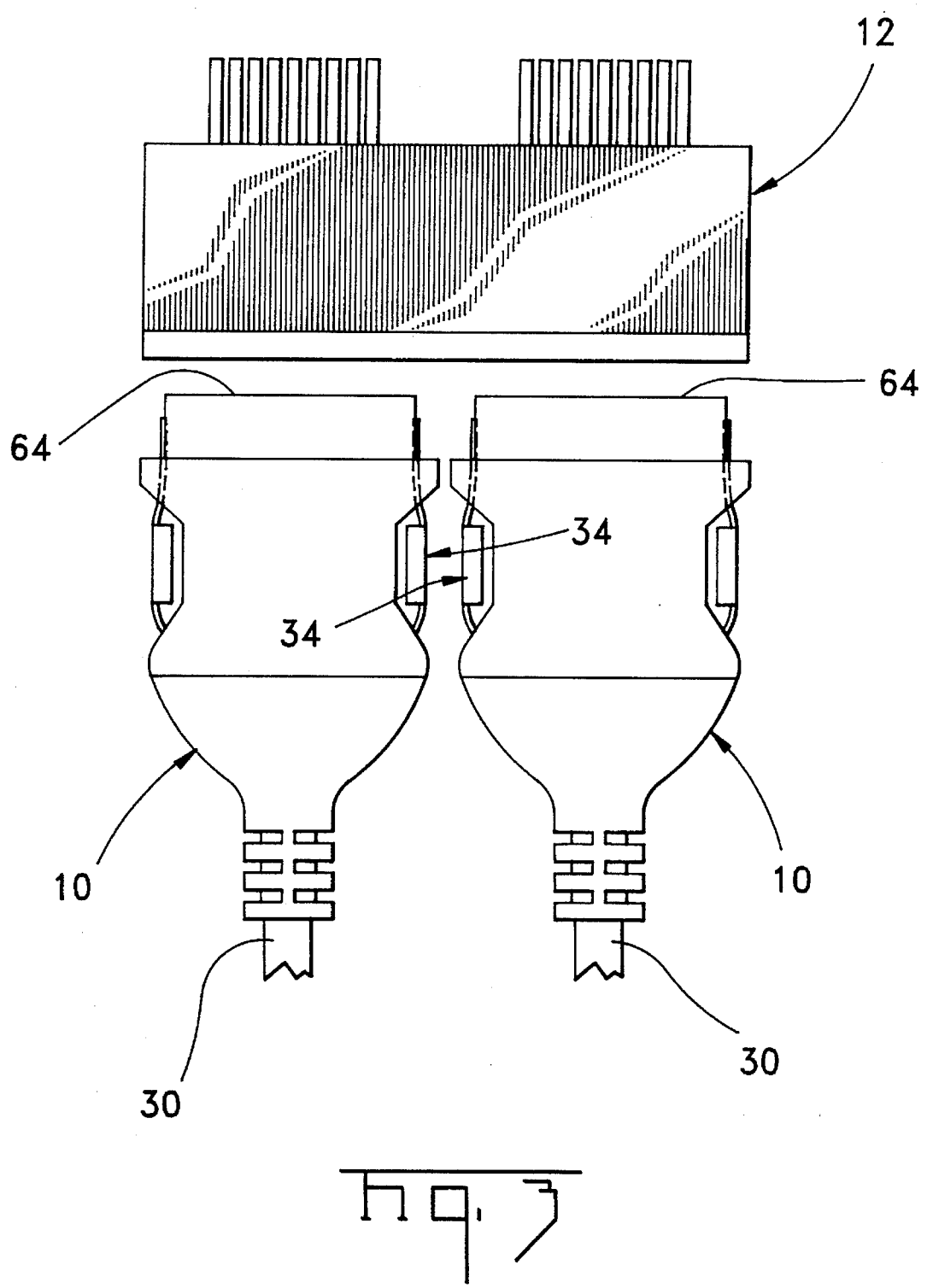
FIG. 3 is a top view of the plug assemblies and receptacle of FIG. 1, in a premated state, showing limited access to the opposing side faces of the respective plug assemblies.

FIGS. 4 and 5 represent the sequence of mating and unmating, respectively, of a plug assembly 10 and receptacle 12 according to this invention. The ramped projection 78, for example, includes a tapered or camming forward surface 80 against which the free end 56 rides as the respective components are brought into mating engagement. As this mating movement continues, the opening 58 eventually overrides the projection 78 and seats thereon to secure such components in a mating relationship. To effect unmating, see FIG. 5, the central portions 50 are laterally or diagonally pushed or squeezed toward one another to free the opening 58 from the projection 78. With the latter elements free of one another, unmating of the components may occur by withdrawing the plug assembly 10 from the receptacle 12. Were this merely a one-on-one situation, little difficulty would be met to effect such unmating. However, as illustrated in FIGS. 1 and 3, multiple plug assemblies, in close proximity to one another, may be mated to a single receptacle. In that situation, as experienced by the prior art, access to the sides of the plug assemblies is nearly impossible. However, by the present invention, unmating may still be effected by diagonally squeezing the central portion 50 of the latching mechanism along the laterally turned wing extensions 59, note the phantom "thumb" in FIG. 5 acting against one of said extensions.

We claim:

1. In a latching mechanism for a pair of intermatable electrical or fiber optic transmission connectors, where lateral access thereto may be limited to effect a manual unmating thereof, said connectors comprising a plug consisting of a housing having top and bottom surfaces, and supporting a first transmission component, and a receptacle for supporting a second transmission component, where said plug includes a pair of cantilevered flexible arms, engagable with complementary latching projections on said receptacle, said arms having exposed intermediate portions movable toward one another to manually disengage said latching projections from said flexible arms, the improvement comprising in combination therewith the provision of each said intermediate portion having a pair of wing extensions directed toward said top and bottom surfaces, where the ends of said extensions are laterally turned to lie parallel with a respective said top or bottom surface.

2. The improved latching mechanism for the pair of intermatable connectors of claim 1, wherein said intermediate portions are U-configured with the respective ends of one said intermediate portion directed towards the respective ends of the other intermediate portion.

3. The improved latching mechanism for the pair of intermatable connectors of claim 2, wherein said top and bottom surfaces of said plug housing are parallel.

4. The improved latching mechanism for the pair of intermatable connectors of claim 3, wherein a free end of each said flexible arm includes an opening for engagement with a corresponding said latching projection.

5. The improved latching mechanism for the pair of intermatable connectors of claim 1, wherein there is a single receptacle and plural plugs intermatable with said receptacle, and said plural plugs are arranged in side-by-side relationship to another said plug.

6. The improved latching mechanism for the pair of intermatable connectors of claim 1, wherein the sides of said plug housing are recessed and each said intermediate portion is in close proximity to a corresponding recessed side.

7. The improved latching mechanism for the pair of intermatable connectors of claim 6, wherein each said flexible arm includes a fixed end and a free end with the said intermediate portion therebetween.

8. The improved latching mechanism for the pair of intermatable connectors of claim 7, wherein said fixed end is internally anchored within said plug housing and extends through an opening in said recessed wall.

9. The improved latching mechanism for the pair of intermatable connectors of claim 1, wherein said plug housing is formed by a pair of cover members, and that means are provided therebetween to integrally join said cover members into a unitary housing.

10. The improved latching mechanism for the pair of intermatable connectors of claim 9, wherein means are provided on said first transmission component to secure same within said plug housing.

* * * * *